United States Patent [19]
Yu

[11] Patent Number: 5,517,527
[45] Date of Patent: May 14, 1996

[54] ADAPTIVE EQUALIZER FOR ISDN U-INTERFACE TRANSCEIVER

[75] Inventor: Ming-Chih Yu, Chu-Tung, Taiwan

[73] Assignee: Industrial Technology Research Institute, Hsinchu, Taiwan

[21] Appl. No.: 989,601

[22] Filed: Dec. 11, 1992

[51] Int. Cl.[6] .................................................. H03H 7/30
[52] U.S. Cl. .......................... 375/233; 375/348; 375/350; 364/724.16; 364/724.2
[58] Field of Search ................................ 375/11, 14, 101, 375/12, 103, 229, 230, 232, 233, 346, 348, 350; 364/724.2, 724.19, 724.16; 333/18, 28 R

[56] References Cited

U.S. PATENT DOCUMENTS

| | | | |
|---|---|---|---|
| 3,775,685 | 11/1973 | Eggimann et al. | 375/11 |
| 4,322,811 | 3/1982 | Voorman | 375/14 |
| 4,789,994 | 12/1988 | Randall et al. | 375/12 |
| 4,905,254 | 2/1990 | Bergmans | 375/14 |
| 5,005,184 | 4/1991 | Amano et al. | 375/14 |
| 5,119,401 | 6/1992 | Tsujimoto | 375/14 |
| 5,230,012 | 7/1993 | Schenk | 375/101 |
| 5,267,265 | 11/1993 | Mizoguchi | 375/14 |
| 5,345,476 | 9/1994 | Tsujimoto | 375/14 |

*Primary Examiner*—Stephen Chin
*Assistant Examiner*—Amanda T. Le
*Attorney, Agent, or Firm*—Bo-In Lin

[57] ABSTRACT

The present invention comprises an adaptive equalizer to be implemented in a receiver to cancel the ISIs. Basically, it has a decision feedback equalizer structure including a feedforward filter and a feedback filter. The receiver further includes a gain controller to properly adjust the amplitude of the equalized signals to reduce the non-equalization bias. It also has a detector to determine the symbol value of +3 +1, −1, and −3 and for generating the error signal to update the coefficients of the equalizer via the adaptive algorithm. The adverse effect of error propagation is reduced by strengthening the function of the feedforward filter. The equalizer training period is also shorten as the gain controller provides additional information for the detector to eliminate the signal bias caused by the non-optimal coefficients of the equalizer.

10 Claims, 5 Drawing Sheets

ADAPTIVE EQUALIZER FOR ISDN U-INTERFACE TRANSCEIVER

BACKGROUND OF THE INVENTION

1. Field of the Invention

This invention relates generally to digital data transmission systems. More particularly, this invention relates to an apparatus and method for adaptive equalization to be utilized in a digital subscriber loop for inter-symbol interference (ISI) cancellation.

2. Description of the Prior Art

The increased demand for data communication including the need to transmit digitized audio and video data at a very high baud rate among user sites has placed great burden on the existing communication networks. The narrow-band telephone lines could potentially be utilized for transmission of these digital data among all user sites. However, the use of the existing user subscribed loops is limited by the inter symbol interference (ISI), especially for high baudrate transmissions of these digitized data.

The interface circuit in a digital user subscribed loop usually comprises a transmitter and a receiver. In the Basic Rate Application of the Integrated Service Digital Network (ISDN) system, the U-interface transceiver transmits and receives digital data at a rate of 160 Kb/s. The data is formatted into frames of 240 bits or 120 bauds including nine baud Barker code for frame synchronization and then encoded by a scrambler to become pseudo-random bit stream. The bit stream is then converted into two-binary, one quaternary (2B1Q) code as proposed by the American National Standard Institute (ANSI) Working Group T1E1. The 2B1Q encoder makes the combination of binary bits 00, 01, 11, and 10 mapped into four corresponding 'symbol' level of $-3, -1, +1,$ and $+3$ respectively. The transmitter filter transfers the symbol levels into analog pulses before the signals are transmitted over the subscriber loops to the remote site.

The input signals to the U-interface transceiver are sampled at a sampling rate of 80 Kbaud per second. These samples are used by the receiver to deride the original digital data via some digital signal process. A typical impulse response of the subscriber loop is shown in FIG. 1. The impulse response is sampled at receiver which generates a plurality of discrete channel responses, i.e., channel responses 1 to 8 as denoted as $h_0, h_1, \ldots, h_6, h_{-1}, h_{-2}$, respectively. The main pulse is identified with a numeral reference 1, i.e., $h_0$, wherein the peak of the pulse is generally referred to as a cursor. In addition to the main pulse 1, there are a pre-cursor under shot 9, i.e., $h_{-2}$ and a long gently decreasing post-cursor tail as represented by channel responses $h_3, h_4, h_5,$ and $h_6$, which may extend to overlap the next main pulse thus creating the 'inter-symbol' interference (ISI). The sampling timing $t_0$ is arranged such that a measurement of $h_0$ is substantially coincide with the peak of the pulse such that a maximum value of $h_0$ is obtained.

Since these pulses are distorted in the process of transmission, i.e., the transmitted pulses are smeared, direct detection of these pulses which is required to be carried out by the receiver thus becomes quite difficult. There are several sources of signal impairment which introduce different types of distortions into the signal pulses in the process of transmission. The first type is caused by the coupling between pulses across the hybrid circuits. This is a common problem when the signals are transmitted over a two-wire system. Such type of distortion is generally referred to as echoes. A transversal filter which utilizes an echo-cancellation algorithm is usually used by a receiver to remove this type of signal distortions.

Other than the echoes, there are also signals distortions caused by inter-symbol interferences (ISI). As shown in FIG. 1, the tail of the distorted impulse response of one pulse may extend to several following pulses. The inter-symbol interference (ISI) is thus generated due to the facts that in sampling a transmitted signal, a receiver received not only the desired signal of the current 'symbol, i.e. S(n), the sampling results comprises signal components S(n+i) due to the precursor tail, and the signal component S(n−i) due to the post cursor tail, where i denotes an integer. The ISI distortions are usually dealt with by means of a decision feedback equalizer (DFE) with a feedforward filter.

In U.S. Pat. No. 4,995,031 entitled 'Equalizer for ISDN-U Interface' issued on Feb. 19, 1991, Aly et al. disclose a receiver for a digital data transmission system which comprises a pre-cursor equalizer. The precursor equalizer utilizes a difference equation such that the equalized digital signals have at least one zero crossing occurring substantially one baud before the main cursor of each pulse.

Although the proposed equalizer by Aly et al. is very effective to reduce the pre-cursor ISI distortions of the received signals, the error propagation caused by the strong post-cursor ISI distortions introduced through the feedback path is not properly processed which may cause a prolonged convergence time thus substantially slowing down the system response. Furthermore, the implementation requires very precise timing circuit and highly sophisticated digital signal processor (DSP) in order to accurately control the sampling time and to assure that the zero crossings of the precursor undershoot occur at an integer multipliers of the sampling period. Such implementation can be very costly and may not be economically feasible in the near future.

Kuenast in another U.S. Pat. No. 5,027,369 entitled 'Rapid Convergence Decision Feedback Equalizer' issued on Mar. 26, 1990, also discloses a DFE which has two separate portions each functions as an individual DFE having different number of taps and different adaptive tap sizes to cancel the post cursor distortions. The two stage DFE equalizer changes the length of the feedback path to prevent error propagating and shorten the training period of the equalizer. However, the proposed equalizer can be quite complicate in design and the coordination between the first and second DFE is also not well defined to assure rapid convergence can be achieved. Additionally, the error propagation may still hinder the efficiency of convergence during the initially transient stage in DFE's process without taking into account the correlation between the precursor and the post-cursor distortions.

Crespo et al. discloses in U.S. Pat. No. 5,031,194 entitled 'Wideband Digital Equalizer for Subscriber Loops' a decision feedback equalizer which compensates the post-cursor ISI by dividing the impulse response of the transmission channel into two regions. A fast acting, close-tracking linear filter is used to compensate the initial rapidly changing unpredictable responses while a slow acting simple, simple, pole-zero filter is used to compensate a relative slowly changing, more predictable asymptotic tail of the impulse response. Again, this may have the same difficulties and limitations as encountered by Kuenast as discussed above. Furthermore, a system stability problem may occur by the use of the infinite impulse response (IIR) filter as disclosed by Crespo et al. which also adds to the complexity of applying the method for ISI cancellations.

Therefore, for those skilled in the art, a need still exists for an improved equalization system and method which is simple in design, easy to be implemented and yet effective and efficient in reducing the transmission distortions including the ISIs from the received signals transmitted over a digital subscriber loop.

SUMMARY OF THE PRESENT INVENTION

It is therefore an object of the present invention to provide an adaptive equalizer to improve the convergence rate whereby the period required for training the equalizer is shortened.

Another object of the present invention is to provide an adaptive equalizer for ISI cancellation wherein the number of required taps of the transversal filter is reduced.

Another object of the present invention is to provide an equalizer for ISI cancellation which utilizes a feedforward filter and feedback filter with a gain controller to minimize the bias existing between the detection level of the detector and the coarse signal amplification whereby the efficiency of the coefficient adjustment for the adaptive algorithm is improved.

Briefly, in a preferred embodiment, the present invention comprises a data processing system for equalizing pulse code modulation (PCM) signals with previous signal distortions and post signal distortions. The data processing system comprises a feedforward filtering means receiving the PCM signals for filtering the previous signal distortions and a portion of the post distortions. The data processing system further comprises an output generating means for processing output data from the feedforward filtering means for generating output signals. The data processing system further includes a feedback filtering means receiving and processing the output signals from the output generating means for generating feedback data. And, the feedforward filtering means further receives the feedback data from the feedback filtering means to further filter the post-cursor ISI distortions.

In an alternate preferred embodiment, the present invention comprises an adaptive equalizer to be implemented in a receiver to cancel the ISIs. Basically, it has a decision feedback equalizer structure including a feedforward filter and a feedback filter. The receiver further includes a gain controller to properly adjust the amplitude of the equalized signals to reduce the non-equalization bias. It also has a detector to determine the symbol value of +3 +1, −1, and −3 and for generating the error signal to update the coefficients of the equalizer via the adaptive algorithm. The adverse effect of error propagation is reduced by strengthening the function of the feedforward filter. The equalizer training period is also shorten as the gain controller provides additional information for the detector to eliminate the signal bias caused by the non-optimal coefficients of the equalizer.

One advantage of the present invention is that it provides an adaptive equalizer with improved convergence rate whereby the training period of the equalizer is shortened.

Another advantage of the present invention is that it provides an adaptive equalizer for ISI cancellation wherein the number of required taps of the transversal filter is reduced.

Another advantage of the present invention is that it provides an equalizer for ISI cancellation which utilizes a feedforward filter and feedback filter with a gain controller to minimize the non-ISI bias existing between the detection level and the equalized signal amplitude whereby the efficiency of the coefficient adjustment for ISI cancellation is improved.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 2:
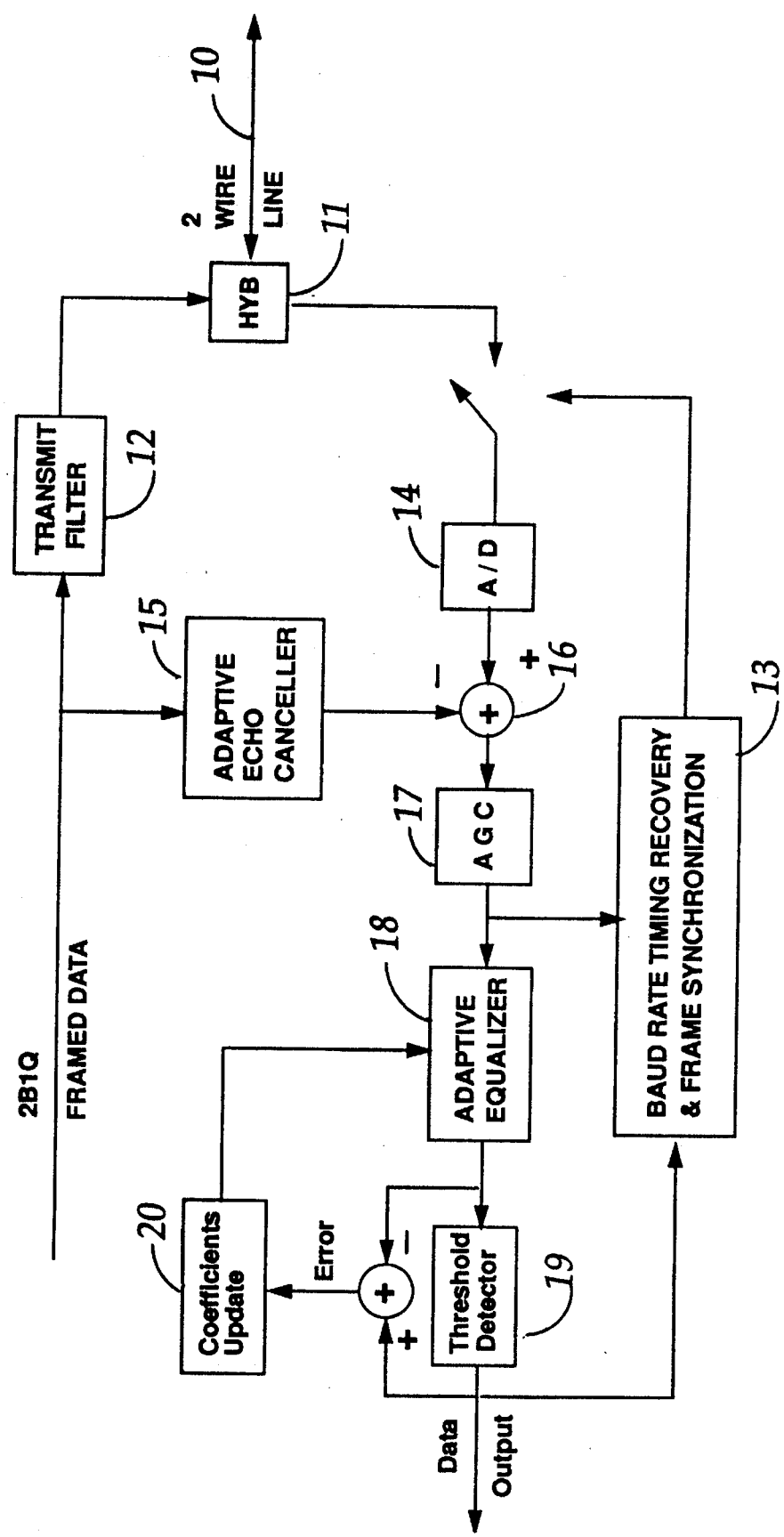
FIG. 2 is a block diagram illustrates the functions of an ISDN-U user interface transceiver with an equalizer for canceling the inter symbol interference.

FIG. 2 shows a block diagram of an ISDN U-interface transceiver wherein a 2B1Q signal of 80 K-bauds per second is transmitted through a twisted wire pair subscriber loop 10. A hybrid box (HYB) 11 ,i.e., a four-to-two wire transformer, is used as an interface to transmit output signal and to receive the incoming transmission from the subscriber loop 10. A timing recovery circuit 13 provides a sampling phase rate to sample the input signals at a rate of 80K samples per second whereby the best analog samples can be obtained by the receiver. Thus each analog sample contains the current symbol S(n) intermixed with interference signals from neighboring symbols, i.e., the pre-cursor ISI and post-cursor ISI, the noises caused by the echoes and the random Guassian noises which transmit throughout the entire system.

The analog samples are then processed by an analog to digital (A/D) converter 14. In the meanwhile, an estimate of an echo noise is also computed by an adaptive echo canceller 15 which is subtracted from the output from the A/D converter in an adder 16 to substantially eliminate the noise generated due the echo effects. After the echo deduction, the signals from the adder 16 are processed by an automatic gain controller (AGC) 17 wherein the signal is amplified by a suitable ratio such that subsequent process can be performed by the receiver to determine which one of the four levels the current symbol represents though the use of the detector that has fixed threshold levels. The AGC 17 determines the rate of amplification by detecting the predefined synchronization pattern, i.e., the Barker code, which typically is a set of numbers arranged as the first nine words of a frame as 3, 3, −3,−3,−3, 3, −3, 3, 3. The AGC 17 compares the first word 3 with a threshold level representing the level 3 to compute a rate of amplification. Every signal within the frame which contains one hundred and twenty 2B1Q signals are proportionally amplified by this rate of amplification. Since the attenuation of the signals during the process of transmission can vary a great deal, the complexity of threshold detector 19 and the time recovery system 13 are greatly reduced by first restoring the level of the received signals to a constant predefined value.

Figure 3:
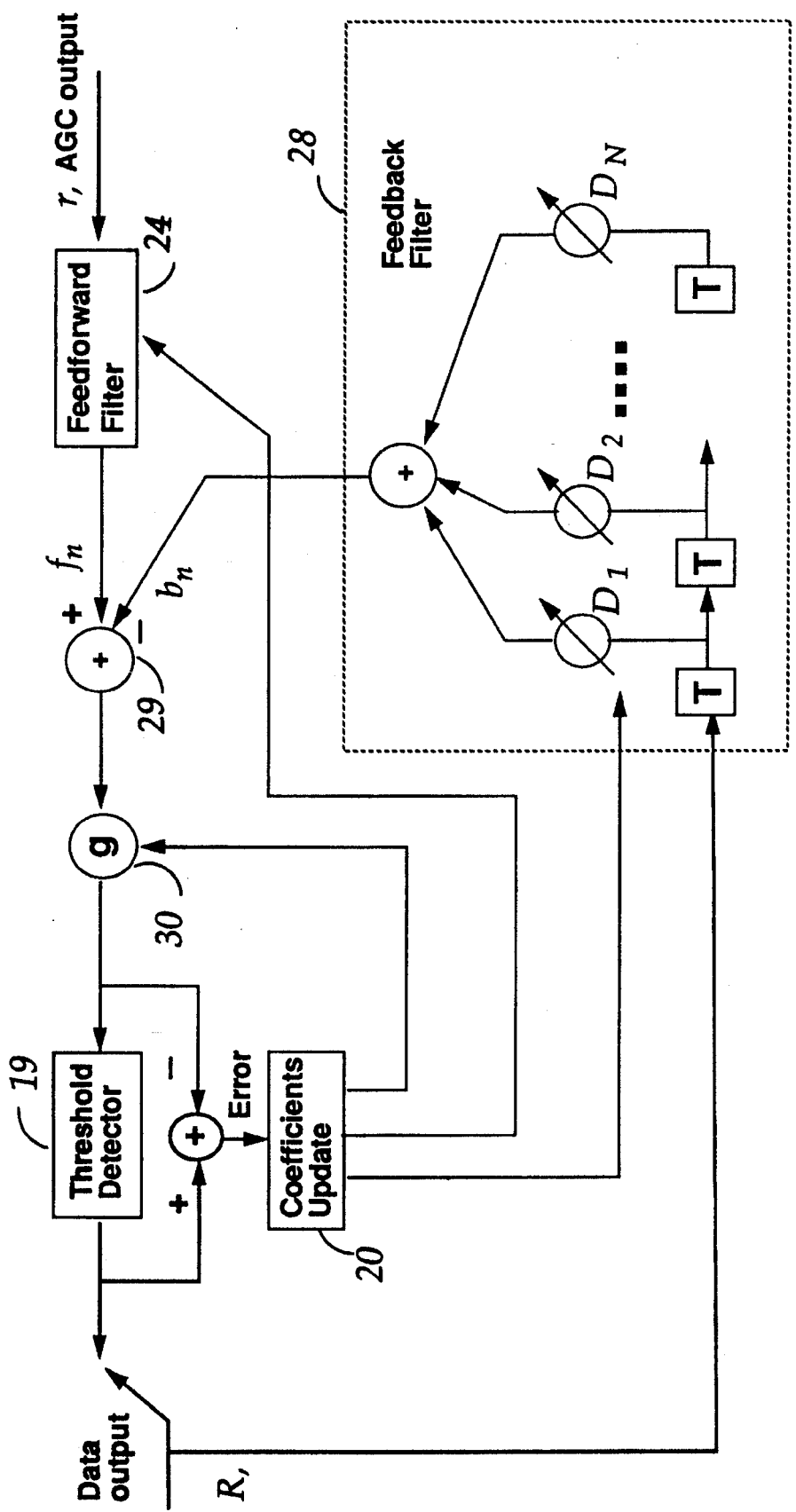
FIG. 3 is a block diagram illustrates the details of the interconnection and functioning steps of the components for an adaptive equalizer for ISI cancellation.
Figure 4:
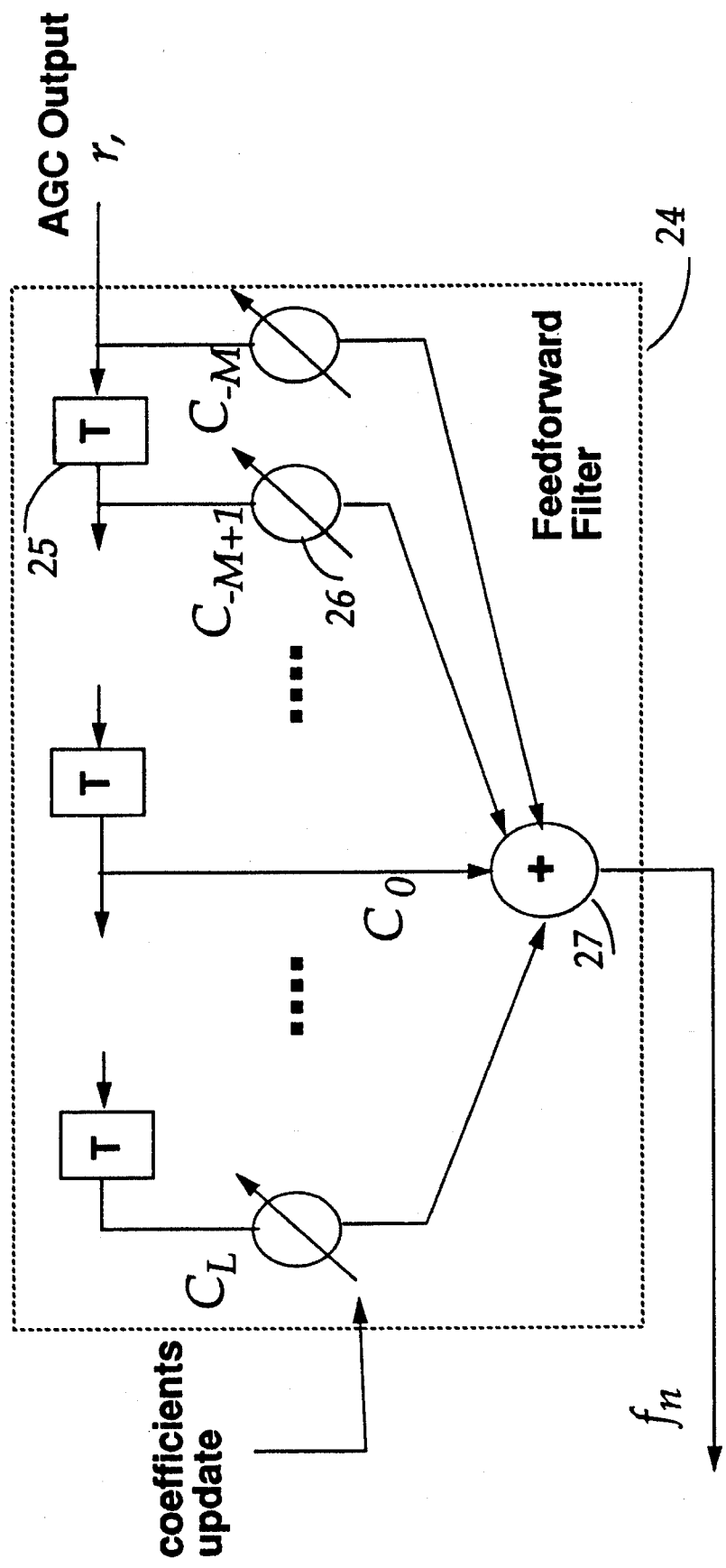
FIG. 4 is a block diagram illustrates the details of the interconnection and the functioning steps of the components for a feedforward filter.

After being processed by the AGC 17, the amplified signals are received by the adaptive equalizer 18. FIG. 3 shows the structure of the equalizer 18. The output from AGC 17 first enters into a feedforward filter 24 which is a FIR filter having a structure of a transversal filter. The structure of the feedforward equalizer 24 is illustrated in FIG. 4. The working function of the feedforward filter is $$f_n = \sum_{j=-M}^{L} Cj r_{n-j}$$

Where $f_n$ is the output signal, Cj are the coefficients of the filter and $r_{n-j}$ are input signals. The coefficient Co is maintained at a constant of 1.0. The feedforward filter thus has (M+L+1) stages. As a basic construction unit of a transversal filter, each stage has two elements, the first element is a delay unit 25 and the second element is a coefficient multiplication unit 26 (see FIG. 4). In each stage, the signal is multiplied by the multiplication coefficient Cj and added in an adder 27 to compute the total output fn. After the process of the feedforward filter 24, most of the pre-cursor ISI and part of the post-cursor ISI is greatly reduced because the feedforward filter is trained to adapt the impulse response of the subscriber loop gradually.

In order to further cancel the post cursor ISI caused by the impulse response of the post-cursor tail 22 (See FIG. 1), the output from the feedforward filter 24 is further processed by a feedback filter 28. The feedback filter 28 is a casual FIR filter having a structure of a transversal filter. The working equation of the feedback filter is $$bn = \sum_{j=1}^{N} Dj R_{n-j}$$

where bn is the estimated post-cursor ISI. In adder 29, a final signal value is determined by subtracting bn from fn. The equalized signal value is multiplied by a gain factor g of a gain controller 30 to compensate the bias from the coarse signal amplification process of the AGC 17 such that the update of the adaptive coefficients to be used by the filter 14 is performed in a more precise manner.

The feedforward filter 24 thus serves as an anti-causal and causal types of filter. The function of the feedforward filter 24 is combined with the feedback filter 28 which is a causal FIR filter to predict the post-cursor ISIs (The definitions of a causal and anti-causal system can be found on page 17 of 'Digital Signal Processing' by Alan V. Oppenheim and Ronald W. Shafer (1975), and page 19 of 'Digital Communications' by Edward A. Lee and David G. Messerschmitt, Kluwer Academic Publishers, 1988.). The feedforward filter 24 thus serves as a major ISI canceller to aid the feedback filter 28 in reducing the error propagation in the initial stage of equalization process. The error propagation is therefore reduced in post cursor ISI computation and the coefficient convergence is accelerated. By preventing error propagation, the training period of the feedback filter for post-cursor ISI cancellation can therefore be shortened and less number of taps would be required to achieve the required processing speed.

The convergence of the equalizer coefficients is further added by the fact that the feedforward filter 24 maintains the weighting for the current symbol, i.e., $C_0$, to be a constant of 1.0, which prohibits unnecessary amplifying of the true signal and the residual ISI. Furthermore, the equalized signal is tuned by the gain controller 30 to delete the bias between the true signal and the threshold level due to the coarse amplification before the equalization process. The gain of device 30 g(n) is updated per baud in accordance with the following formula:

$$g(n+1)=g(n)+R(n)*\text{error}(n)$$

Where R(n) is the current output symbol from the threshold detector 19 and error(n) represents the difference between the input and the output of the threshold detector 19.

The adaptive equalizer 18 has therefore canceled most of the ISI distortions thus allowing the threshold detector 19 to apply the predefined thresholds to the equalized signals in detecting the levels of these signals to accurately interpret the data as transmitted through the 2B1Q signals. The output signals from the threshold detector 19 are used as the output signals of the receiver for further processes. The differences between the input and the output signals of the threshold detector 19 is further used by the coefficient update processor 20 to update the coefficients used by the equalizer 18 whereby the efficiency and the accuracy of the equalizer 18 can be further improved.

Mathematically, the operations of the present invention can be summarized as the followings:

The feedforward filter is utilized as an FIR filter which has a filter working equation as:

$$fn = \sum_{j=-M}^{L} Cj\, r(n-j) \qquad (1)$$

where n=an integer represents current symbol;

fn=the output signal of the feedforward filter for the current symbol;

Cj=coefficient for weighting the input signals of the j-th stage; and r(n-j) is signal stored at j-th stage.

The function of the feedforward filter is used to cancel most of the precursor ISI and part of the post-cursor ISI such that the error propagation which may be introduced through the feedback filter can be reduced in the early stage of the equalizer process to speed up the convergence speed of the receiver.

Figure 1:
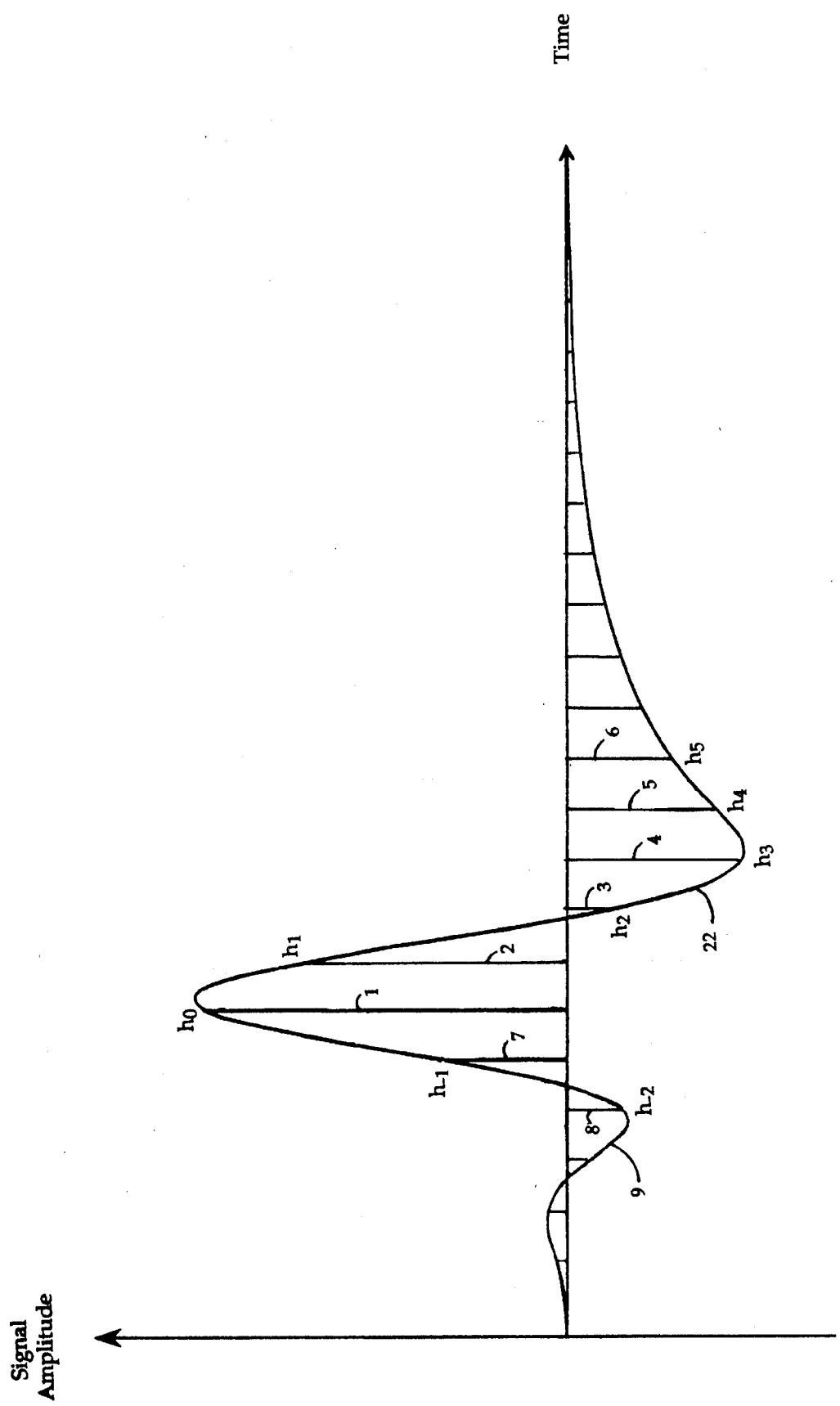
FIG. 1 shows a typical impulse response of user subscriber loop.

The equalization process of the feedforward filter can be further explained by the following equations using three simple three-tap systems (FIGS. 5A to 5C) for illustration. The received signal r(n) which is being sampled at a baud period of T can be represented as:

$$r(n) = \sum_{j \leq (n-1)} Xj h(t_o + (n-j)T) + Xn h(to) + \sum_{j \geq (n+1)} Xj h(t_o + (n-j)T)$$

Where Xj is the 2B1Q data and $h(t_o)$ is the channel response at time $t_o$ as shown in FIG. 1 at various points in time.

Figure 5A:
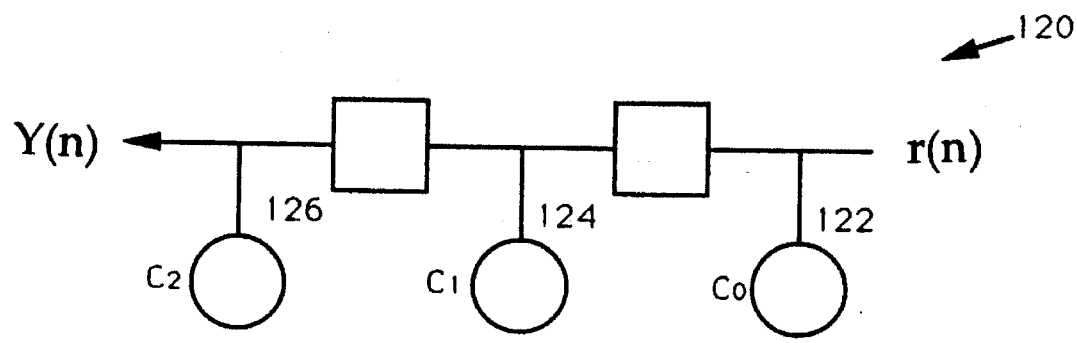
FIGS. 5A to 5C show the block diagrams of three different three-tap FIR filters.

Referring to FIG. 5A where a causal FIR filter 120 with three taps 122, 124, and 126 is shown wherein three coefficients, i.e., $C_0$, $C_1$, and $C_2$ are applied respectively. The output signal Y(n) can be represented as:

$$Y(n)=C_0 r(n)+C_1 r(n-1)+C_2 r(n-2)$$

Figure 5B:
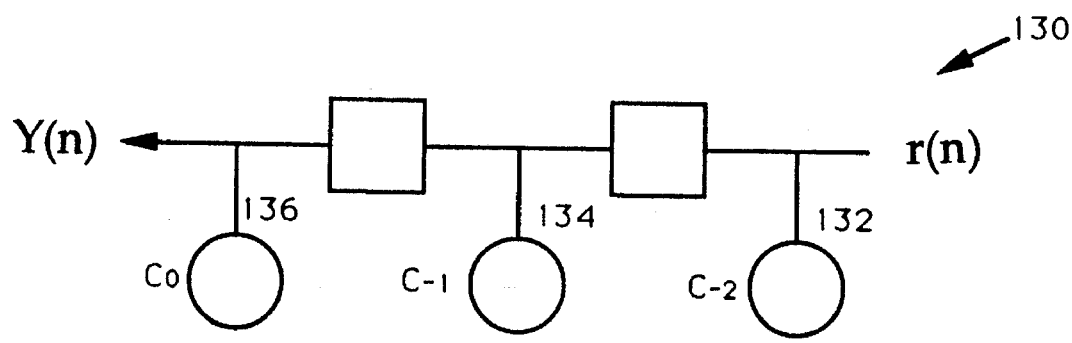

Similarly, FIG. 5B shows an anti-causal FIR filter 130 with three taps 132, 134, and 136 each with a coefficient of $C_{-2}$, $C_{-1}$, and $C_0$ applied respectively and the output can be represented as:

$$Y(n)=C_0 r(n)+C_{-1} r(n+1)+C_{-2} r(n+2)$$

Figure 5C:
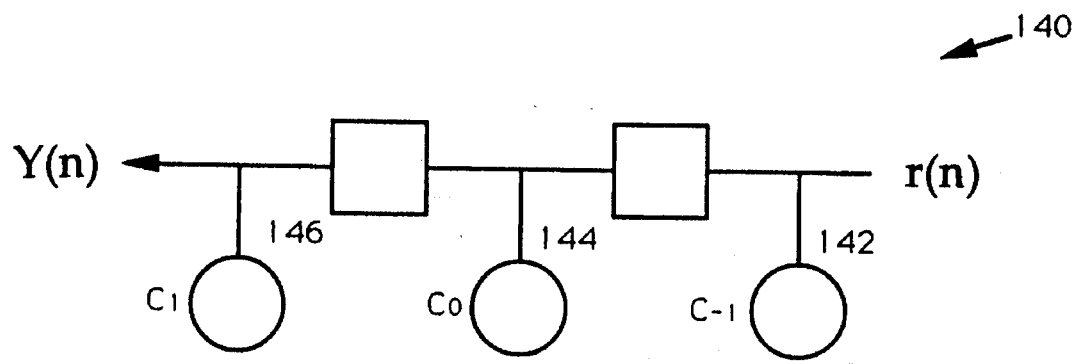

FIG. 5C shows a feedforward filter 140 according to the present invention which also has three taps, i.e., taps 142, 144, and 146 each with a coefficient of $C_{-1}$, $C_0$, and $C_1$ respectively and the output of the filter 140 can be represented as:

$$Y(n)=C_0 r(n)+C_{-1}r(n+1)+C_1 r(n-1) \qquad (5)$$

By substituting r(n) into the above three equations, the coefficients of Xn−1, Xn, and Xn+1 are obtained for the three-tap filters 120, 130 and 140 as listed below.

Case A: The Coefficients for Causal Three-Tap Filter 120
1. Xn−1 $(C_0 h_1 + C_1 h_0 + C_2 h_{-1})$
2. Xn $(C_0 h_0 + C_1 h_{-1} + C_2 h_{-2})$
3. Xn+1 $(C_0 h_{-1} + C_1 h_{-2} + C_2 h_{-3})$ Case B: The Coefficients for Anti-Causal Three-Tap Filter 130
1. Xn−1 $(C_0 h_1 + C_{-1} h_2 + C_{-2} h_3)$
2. Xn $(C_0 h_0 + C_{-1} h_1 + C_{-2} h_2)$
3. Xn+1 $(C_0 h_{-1} + C_{-1} h_0 + C_{-2} h_1)$ Case C: The Coefficients for Three-Tap Filter 140 of Present Invention
1. Xn−1 $(C_0 h_1 + C_{-1} h_2 + C_1 h_0)$
2. Xn $(C_0 h_0 + C_{-1} h_1 + C_1 h_{-1})$
3. Xn+1 $(C_0 h_{-1} + C_{-1} h_0 + C_1 h_{-2})$ The feedforward filter 24 is used to cancel the pre-cursor and the post-cursor ISIs, i.e., to minimize the weighting of Xn−1 and Xn+−1 while generating the value of the true data $h_0 X_n$. The purpose is achieved by maintaining the value of CO as a constant of one such that the received signal r(n) and the associated ISI are not amplified in the filtering process while the tap coefficients Ci can be adaptively adjusted to approach the optimal values for equalization.

By maintaining the value of $C_0$ at a constant value of one, the effectiveness of the filters can be evaluated by examining the above equations, specifically the weighting factors of Xn−1 and Xn+1. The weighting factor of Xn+1 in the causal filter 120, i.e., $C_0 h_{-1} + C_1 h_{-2} + C_2 h_{-3}$, cannot be depressed because the discrete channel responses $h_{-2}$ and $h_{-3}$ are small and negligible. The weighting factor of $X_{n+1}$ of the causal filter 120 which is approximately $C_0 h_{-1}$ is therefore being maintained at a value of $h_{-1}$ due to the requirement of keeping $C_0$ as one. Comparing to $h_0$, the value of $h_{-1}$ is relative significant. The causal filter 120 is thus not effective in canceling the pre-cursor ISIs.

On the other hand, the weighting factor of $X_{n-1}$ of the anti-causal filter 130, i.e., $(C_0 h_1 + C_{-1} h_2 + C_{-2} h_3)$, cannot be depressed efficiently to achieve a fast convergence because there is no $h_0$ terms which has a greater numerical value and may be used to counter balance the $C_0$ terms, i.e., $C_0 h_1$. The weighting factor of Xn−1 is kept at a value close to $h_1$ initially and cannot be efficiently reduced because $C_0$ is maintained at one and the value of $h_1$ is generally much greater than $h_2$ and $h_3$.

The causal and the anti-causal filters 120 and 130 as commonly employed in the prior art are therefore not effective in canceling the ISI distortions. In contrast, the linear equalizer according to the present invention does not have that difficulties. The channel response $h_0$ is present in weighting factors of both the Xn−1 and Xn+1. The equalizer can effectively adjust the weighting of each tap to minimize the weighting of Xn−1 and Xn+1 while maintaining an optimal value of $h_0$ to closely approximates that of Xn by assigning a fix value of 1.0 to $C_0$.

the feedback filter is a causal FIR filter for predicting the post-cursor ISI by use of the equation:

$$bn = \sum_{j=1}^{N} Dj\, Rn-j$$

where
bn=the output of the feedback filter;
Dj=the coefficient for weighting the input signal of the j-th stage
Rn-j=the signal stored at the j-th stage.
The output of the equalizer is therefore $$y(n)=f(n)-b(n) \qquad (3)$$

The calculated y(n) as processed by the equalizer is a close approximation of the current symbol signal S(n) with minimal amount of ISI caused by either the pre-cursor or the post-cursor interferences.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A data processing system for equalizing pulse code modulation (PCM) signals with previous signal distortions and post signal distortions wherein said PCM signals r(n) being sampled at a baud period of T and being represented by:

$$r(n) = \sum_{j \leq (n-1)} Xjh(t_0 + (n-j)T) + Xnh(t0) + \sum_{j \geq (n+1)} Xjh(t_0 + (n-j)T)$$

Where n being a positive integer, Xj being a 2B1Q data and $h(t_o)$ being a channel response at time $t_o$, said data processing system comprising:

a feedforward filtering means being a linear equalizing means including an anti-causal finite impulse filter (FIR) and a causal FIR filter for receiving and for filtering said previous signal distortions and a portion of said post distortions in said PCM signals for generating an output signal containing a major component $X_n h(t_0)$;

a threshold detector for receiving said output signal containing a major component $X_n h(t_0)$ generated by said feedforward filtering means for determining a threshold level for said PCM signals and generating corresponding equalized output signals;

an output means for receiving from said threshold detector and then outputting said corresponding equalized output signals;

a feedback filtering means receiving and processing said equalized output signals from said output means for generating feedback signals; and said feedforward filtering means further receives said feedback signals from said feedback filtering means to adaptively adjust said feedforward filtering means.

2. The data processing system of claim 1 wherein:

said linear equalizing means includes M+L+1 stages for performing a filtering function of:

$$f_n = \sum_{j=-M}^{L} C_j r_{n-j}$$

where M, L, are positive integers, $f_n$ is the output signal $C_j$ are the coefficients of said filtering means and the coefficient $C_0$ is maintained at a constant value of one.

3. The data processing system of claim 2 wherein:
said feedforward filtering means further including a subtracting means for subtracting said feedback signal received from said feedback filtering means from said output signal containing a major component $X_n h(t_0)$ generated by said feedforward filtering means to generate a post-feedback signal.

4. The data processing system of claim 3 wherein:
said threshold detector further includes a threshold error generating means for generating a threshold error representing the difference between the input and the output signals of said threshold detector.

5. The data processing system of claim 4 further comprises:
a coefficient update means for receiving said threshold error from said threshold error generating means for generating coefficient update output signals; and
a gain controller for receiving said post-feedback signal from said subtracting means and said coefficient output signals from said coefficient update means for deleting said threshold error in performing a gain compensation on said post-feedback signal.

6. A communication system for receiving and sampling a stream of pulse code modulation (PCM) signals with previous signal distortions and post signal distortions including a data processing system for equalizing said PCM signals wherein said PCM signals r(n) being sampled at a baud period of T and being represented by:

$$r(n) = \sum_{j \leq (n-1)} X_j h(t_0 + (n-j)T) + X_n h(t0) + \sum_{j \geq (n+1)} X_j h(t_0 + (n-j)T)$$

Where n being a positive integer, Xj being a 2B1Q data and $h(t_o)$ being a channel response at time $t_o$, said data processing system comprising:
a feedforward filtering means being a linear equalizing means including an anti-causal finite impulse filter (FIR) and a causal FIR filter for receiving and for filtering said previous signal distortions and a portion of said post distortions in said PCM signals for generating an output signal containing a major component $X_n h(t_0)$;
said linear equalizing means includes M+L+1 stages for performing a filtering function of:

$$f_n = \sum_{j=-M}^{L} C_j r_{n-j}$$

where M, L, are positive integers, $f_n$ is the output signal, $C_j$ are the coefficients of said filtering means and the coefficient $C_0$ is maintained at a constant value of one;
a threshold detector for receiving said output signal containing a major component $X_n h(t_0)$ generated by said feedforward filtering means for determining a threshold level for said PCM signals and generating corresponding equalized output signals;
said threshold detector further including a threshold error generating means for generating a threshold error representing the difference between the input and the output signals of said threshold detector;
an output means for receiving from said threshold detector and then outputting said corresponding equalized output signals;
a feedback filtering means receiving and processing said equalized output signals from said output generating means for generating feedback signal;
said feedforward filtering means further including a subtracting means for subtracting said feedback signal received from said feedback filtering means from said output signal containing a major component $X_n h(t_0)$ generated by said feedforward filtering means to generate a post-feedback signal; a coefficient update means for receiving said threshold error from said threshold error generating means for generating coefficient update output signals;
a gain controller for receiving said post-feedback signal from said subtracting means and said coefficient output signals from said coefficient update means for deleting said threshold error in performing a gain compensation on said post-feedback signal; and
said feedforward filtering means further receives said feedback signal from said feedback filtering means to adaptively adjust said feedforward filtering means.

7. The communication system of claim 6 further comprises:
a time recovery means for controlling said sampling of said stream of PCM signals;
an adaptive echo cancellation means for canceling an echo noise from said sampled PCM signals; and
an automatic gain controlling (AGC) means for amplifying said signals from said adaptive echo canceling means by a predefined ratio and for transmitting the amplified signals to said data processing system for signal equalization.

8. A data processing method for equalizing pulse code modulation (PCM) signals with previous signal distortions and post signal distortions said PCM signals wherein said PCM signals r(n) being sampled at a baud period of T and being represented by:

$$r(n) = \sum_{j \leq (n-1)} X_j h(t_0 + (n-j)T) + X_n h(t0) + \sum_{j \geq (n+1)} X_j h(t_0 + (n-j)T)$$

Where n being a positive integer, Xj being a 2B1Q data and $h(t_o)$ being a channel response at time $t_o$, said method comprising the steps of:
a) utilizing a feedforward filtering means for receiving said PCM signals and filtering said previous signal distortions and a portion of said post distortions for generating an output signal containing a major component $X_n h(t_0)$ by performing a filtering function of:

$$f_n = \sum_{j=-M}^{L} C_j r_{n-j}$$

where M, L, are positive integers, $f_n$ is the output signal, Cj are the coefficients of said filtering means and the coefficient $C_0$ is maintained at a constant value of one;
b) processing said output signal from said feedforward filtering means for generating an equalized signal;

c) processing said equalized signal for generating a feedback signal and feeding back said feedback signal to said feedforward filtering means and d) utilizing said feedback signal to adaptively adjust said feedforward filtering means.

9. The data processing method of claim 8 wherein said step b) further comprises the steps of:

b1) utilizing a threshold detector for receiving said current PCM signal generated by said feedforward filtering means for determining a threshold level for said current PCM signal;

b2) generating a threshold error representing the difference between the input and the output signals of said threshold detector.

10. The data processing method for equalizing said pulse modulation signals of claim 9 further comprises the steps of:

e) subtracting said feedback signal from the output signal of said feedforward filtering means for generating a post-feedback signal;

f) receiving said threshold error from a coefficient update means for generating coefficient update output signals; and g) receiving said post-feedback signal and said threshold error from threshold detector and said coefficient update output signals for deleting said threshold error in performing a gain compensation on said post-feedback signal.

* * * * *